UNITED STATES PATENT OFFICE.

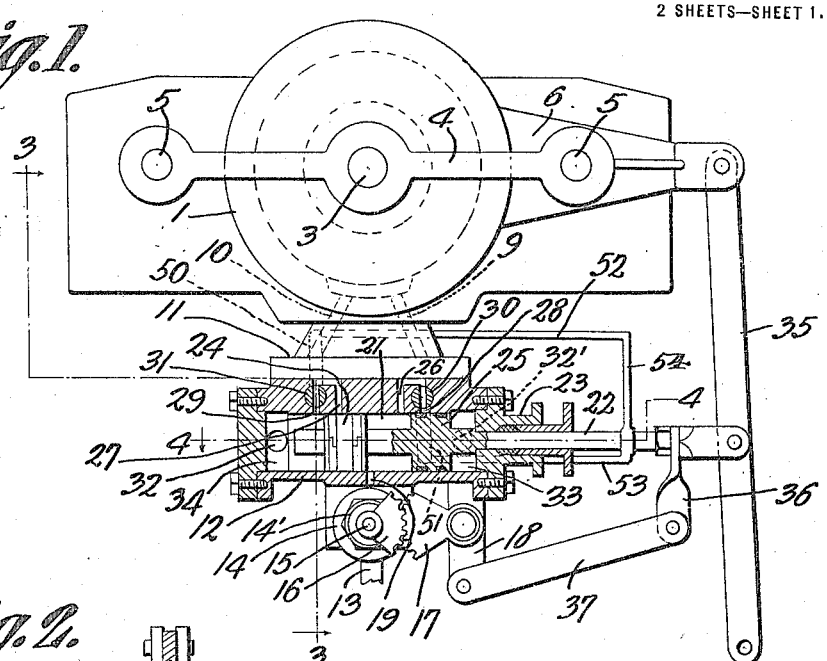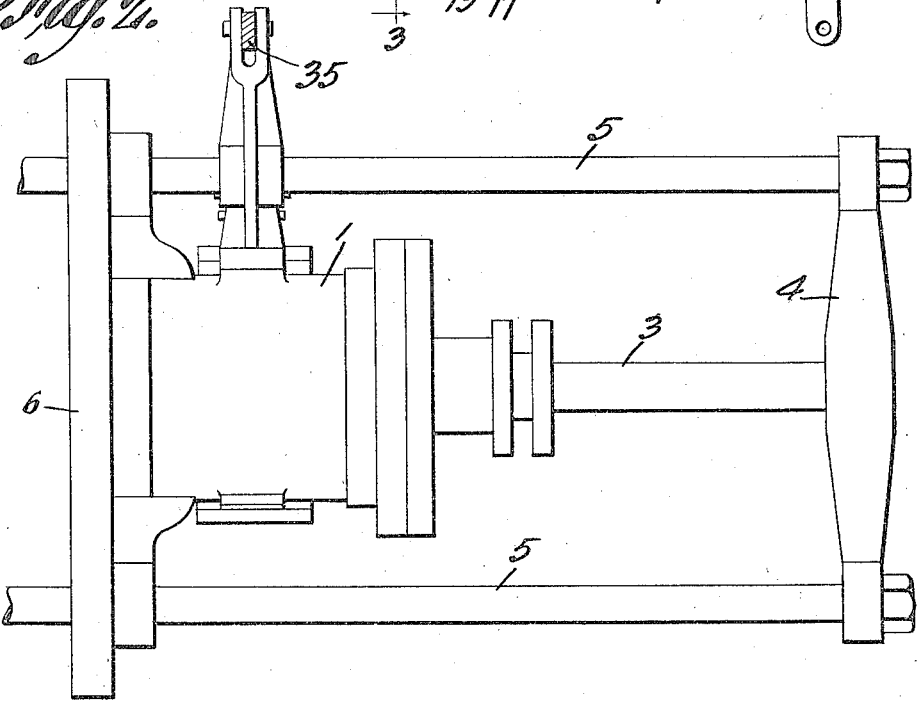

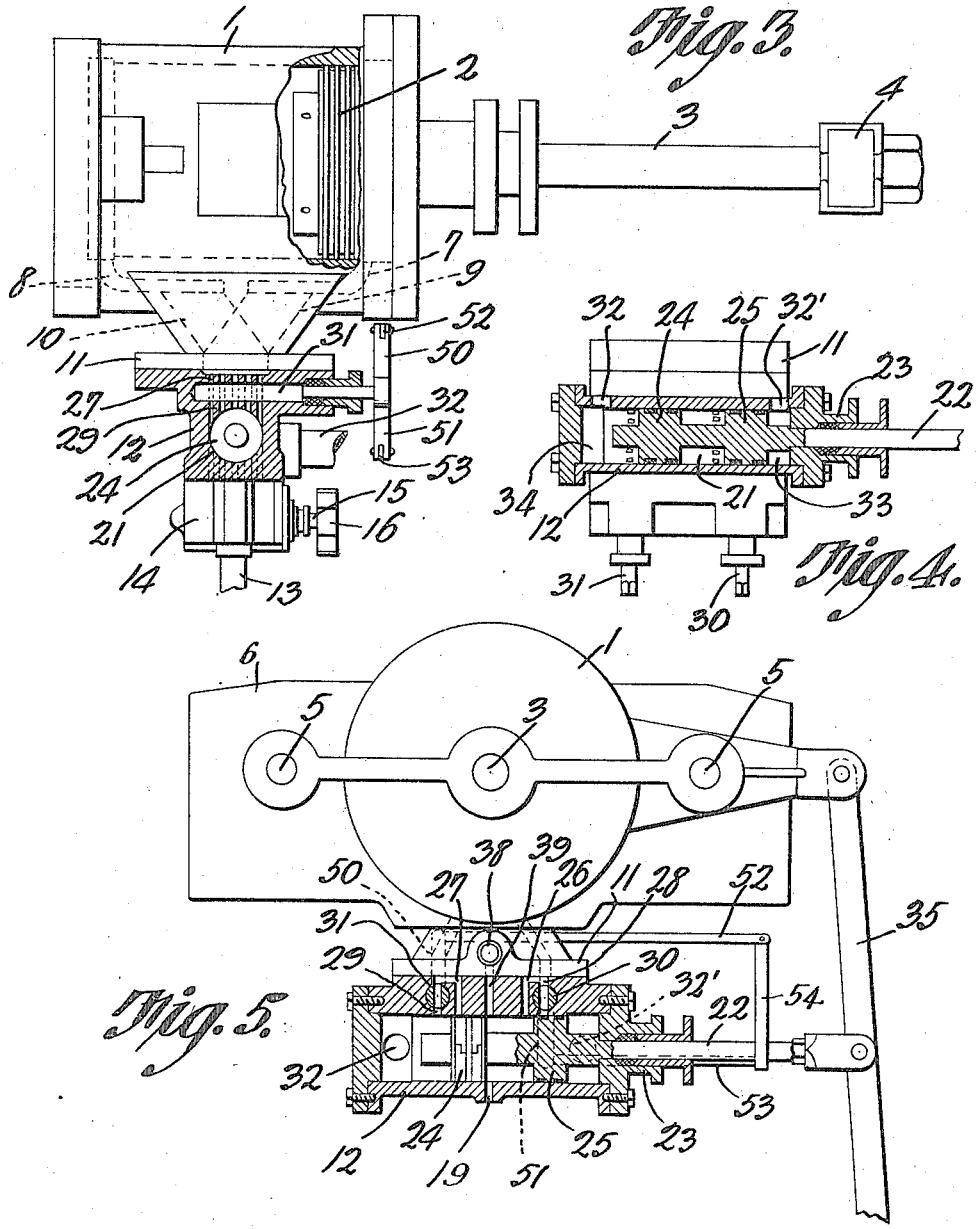

THOMAS O. WERNER, OF BANGOR, PENNSYLVANIA.

VALVE MECHANISM.

1,185,034.  Specification of Letters Patent.  Patented May 30, 1916.

Application filed May 2, 1914. Serial No. 835,965.

*To all whom it may concern:*

Be it known that I, THOMAS O. WERNER, a citizen of the United States, residing at Bangor, in the county of Northampton and State of Pennsylvania, have invented a new and useful Valve Mechanism, of which the following is a specification.

The present invention appertains to valve mechanisms, and aims to provide a novel and improved structure of that character.

It is also within the scope of the invention to provide a valve mechanism embodying novel means for controlling the exhaust of the steam or pressure fluid from the cylinder, whereby a cushioning effect may be provided.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a view in end elevation of the power cylinder with the pressure fluid controlling mechanism shown in longitudinal section. Fig. 2 is a bottom plan view of the complete mechanism. Fig. 3 is a section taken on line 3—3 of Fig. 1. Fig. 4 is a section taken on line 4—4 of Fig. 1. Fig. 5 is a view similar to Fig. 1 of a modified form.

Referring to the drawings, the numeral 1 designates the power cylinder, which is provided with the power piston 2 operably connected to the piston rod 3, there being a cross head 4 connected to the rod 3 and operably connected to the driving rods 5 mounted for reciprocation in the supporting frame 6.

The cylinder 1 has a piston 2 whose stem 3 is connected to a yoke 4 attached to rods 5 sliding through the frame 6.

The cylinder 1 is provided with the pressure fluid channels 7 and 8 extending from the opposite ends of the cylinder 1, and an extension 11 of the cylinder is provided with a series of passages 9 and 10 extending from the adjacent ends of the channels 7 and 8, respectively. There are a plurality of ports in each series and the ends thereof are arranged in a line parallel with the axis of the cylinder.

The valve mechanism embodies a cylindrical casing 12 arranged at right angles with the cylinder 1, and attached to the extension 11 of the cylinder. A steam or pressure fluid supply pipe 13 is connected to the casing 12 between its ends, and is provided with a valve casing 14 in which a valve 14' is rotatable for controlling the admission of steam into the casing 12. The valve stem 15 has a gear segment 16 secured thereto, and the casing 12 is provided between its ends with an inlet port 19 communicating with the supply pipe 13.

Slidable through the packing means 23 at one end of the casing 12, is a valve stem or rod 22, which projects within the casing 12, and which has a double piston valve working within said casing, and embodying the spaced pistons 24—25, between which there is annular space 21.

The casing 12 is provided with transverse series of ports 26, 27, 28 and 29, there being a number of ports in each series, according to the number of ports 9—10. The ports 26—27 are intake ports, and are disposed at the opposite sides of the central or intermediate portion of the casing 12 in which the port 19 is located, the ports 26—27 being disposed between the ends of the casing and the transverse plane in which the port 19 is located. The ports 28—29 are located adjacent the respective ports 26—27, and are disposed between the ports 26—27 and the ends of the casing 12. The pistons 24—25 are of sufficient width, so that when the piston valve is in an intermediate position, the pistons close all of the ports 26, 27, 28 and 29. When the piston valve is moved toward one end of the cylinder, the ports 26 and 29 are opened, while the ports 27 and 28 are closed, and conversely, when the piston valve is moved toward the other end of the cylinder, the ports 27 and 28 are opened, while the ports 26—29 are closed. The ports 28—29 are exhaust ports, and the ports 27—29 communicate with the passages 10, while the ports 26—28 communicate with the passages 9.

Journaled through the casing 12 so as to intersect the ports 28 and 29 are the respective rotary valves 30—31 having openings or ports to be brought into and out of registration with the respective ports 28—29.

The casing 12 is provided adjacent its ends with outlet ports 32—32' located between the ends of the casing and the transverse planes of the casing in which the ports 28—29 are disposed. The ports 32—32' lead to the atmosphere. There is a space 33 between the piston 25 and one end of the casing 12, and a space 34 between the other piston 24 and the other end of the casing.

The valve stem 22 may be operated manually in any suitable manner, and to this end a lever 35 is fulcrumed to the frame 6 and is pivoted to the outer end of the stem 22.

The valve 14' is operated when the stem 22 is reciprocated, and to this end a gear segment 17 meshing with the segment 16 has an arm 18 connected by a link 37 with an arm 36 of the rod 22, whereby when the rod 22 is reciprocated, the valve 14' is rotated. In this manner, the supply of steam can be controlled as desired.

To operate the valves 30—31, which can be oscillated in unison, the outer ends of said valves are provided with arms 51—50, respectively, which are connected by the respective links 53—52 with a member 54 slidable upon the stem 22. When the member 54 is slid, the valves 30—31 can be moved to open and closed positions.

The present mechanism may be used in connection with steam actuated winding drums or winding machines, or elsewhere, where the piston rod is moved for shifting a member, and when a cushioning effect is desired after the piston rod has moved a certain amount. In operation, taking the parts as illustrated in Fig. 1, the steam can flow from the pipe 13 through the port 19 into the space 21, and can flow through the ports 26, passages 9 and channel 7 into the respective end of the cylinder, to move the piston toward the opposite end. When it is desired to cushion the piston, the member 54 can be operated for closing both of the valves 30—31, and since the valve 31 is closed, the exhaust of steam from the last mentioned end of the cylinder through the channel 8, passages 10, and ports 29 into the space 34 is checked up. This provides a cushioning effect. When the valves 30—31 are opened, the steam can readily flow into the space 34 and thence out through the port 32. When the piston valve is slid so as to cover the ports 26—29, the steam will flow through the port 27, passages 10 and channel 8 into the respective end of the cylinder, for moving the piston correspondingly, and the exhaust steam will pass through the channel 7, passages 9 and port 28 into the space 33 to be discharged out through the port 32'. When the valves 30—31 are closed, the flow of steam into the space 33 is stopped to provide the cushioning effect. By providing the independent ports 26, 27, 28 and 29, both of the valves 30—31 can be operated simultaneously without effecting the flow of steam into the cylinder.

In the form of valve mechanism shown in Fig. 5, the introductory valve member 14 and its mechanism is dispensed with, the port 19 being sealed, the entrance port being positioned at 38 and in communication with the port 39; otherwise the operation of the parts is identical, the two valves 30 and 31 being disposed as heretofore described and the mechanism operating identical with that heretofore described.

From the foregoing description, taken in connection with the drawings, it is evident that with a valve structure of this character, that the pressure fluid will be properly directed to and from the respective ends of the cylinder and at the desired point of movement in the cylinder, the exhaust pressure will be checked and thus a cushioning effect will be afforded the power piston so that the same will not abut or strike the head of the cylinder.

What is claimed is:

1. The combination with a power cylinder, of a valve mechanism embodying a casing provided intermediate its ends with an inlet port, said casing being provided between its ends and intermediate portion with intake ports 26—27 communicating with the opposite ends of the cylinder, said casing having exhaust ports 28—29 between its ends and the ports 26—27 and adjacent said ports, the casing also having outlet ports at its ends, oscillatory valves for controlling the ports 28—29 and having arms, the ports 26—27 providing by-passes leading from the casing past the valves, a valve stem slidable through one end of said casing and having a pair of spaced pistons working in said casing, said pistons when moved in one direction closing the ports 27—28 and when moved in the opposite direction closing the ports 26—29, a slidable member, and links connecting said slidable member and arms.

2. The combination with a power cylinder, of a valve mechanism embodying a casing provided intermediate its ends with an inlet port, said casing being provided between its ends and intermediate portion with intake ports 26—27 communicating with the opposite ends of the cylinder, said casing having exhaust ports 28—29 between its ends and the ports 26—27 and adjacent said ports, the casing also having outlet ports at its ends, oscillatory valves for controlling the ports 28—29 and having arms, the ports 26—27 providing by-passes leading from the casing past the valves, a valve stem slidable through one end of said casing and having a pair of spaced pistons working in said casing, said pistons when moved in one direction closing the ports 27—28 and when moved in the opposite direction closing the ports 26—29, a member slidable upon said valve stem, and links connecting said slidable member and arms.

In testimony that I claim the foregoing as my own I have hereto affixed my signature in the presence of two witnesses.

THOMAS O. WERNER.

Witnesses:
SELINA WILLSON,
I. E. SIMPSON.